United States Patent
Sigl

(10) Patent No.: US 11,707,871 B2
(45) Date of Patent: *Jul. 25, 2023

(54) HOOK AND LOOP FASTENER CONNECTOR

(71) Applicant: Gummi-und Kunststoffwerk G. SCHÖNEK, GmbH & Co KG, Nittenau (DE)

(72) Inventor: Michael Sigl, Nittenau (DE)

(73) Assignee: Gummi-und Kunststoffwerk G. SCHONEK, GmbH & Co KG, Nittenau (DE)

( * ) Notice: Subject to any disclaimer, the term of this patent is extended or adjusted under 35 U.S.C. 154(b) by 106 days.

This patent is subject to a terminal disclaimer.

(21) Appl. No.: 17/400,200

(22) Filed: Aug. 12, 2021

(65) Prior Publication Data
US 2022/0061472 A1    Mar. 3, 2022

(30) Foreign Application Priority Data

Aug. 26, 2020 (EP) .................................. 20192919

(51) Int. Cl.
*A44B 18/00* (2006.01)
*B29C 45/26* (2006.01)
*B29C 33/42* (2006.01)
*B29C 45/44* (2006.01)
*B29L 31/00* (2006.01)
*B60N 3/04* (2006.01)
*B29C 45/00* (2006.01)

(52) U.S. Cl.
CPC ...... *B29C 45/2626* (2013.01); *A44B 18/0049* (2013.01); *A44B 18/0061* (2013.01); *B29C 33/42* (2013.01); *B29C 45/4407* (2013.01); *B29C 2045/0094* (2013.01); *B29L 2031/729* (2013.01); *B60N 3/046* (2013.01); *Y10T 428/24017* (2015.01)

(58) Field of Classification Search
None
See application file for complete search history.

(56) References Cited

FOREIGN PATENT DOCUMENTS

| DE | 102009054896 A1 | 6/2011 |
|---|---|---|
| DE | 202016102805 U1 | 11/2016 |
| EP | 2269480 A1 | 1/2011 |

OTHER PUBLICATIONS

Raicher, Gerald, European Search Report and Search Opinion from EP 20192919, dated Jan. 15, 2021, pp. 1-7, European Patent Office, Munich, Germany.

*Primary Examiner* — Alexander S Thomas
(74) *Attorney, Agent, or Firm* — Ballard Spahr LLP

(57) ABSTRACT

A hook-and-loop fastener connector having a plurality of hooks (7) arranged on a base plate (16). The hooks (7) exhibit a hook foot (8) and a hook head (9). The hook foot (8) and hook head (9) are arranged within one plane. The plane (10) and the base plate (16) are angled to each other at an angle (ß) greater than 90°.

21 Claims, 3 Drawing Sheets

HOOK AND LOOP FASTENER CONNECTOR

CROSS REFERENCE TO RELATED APPLICATIONS

Figure 1:
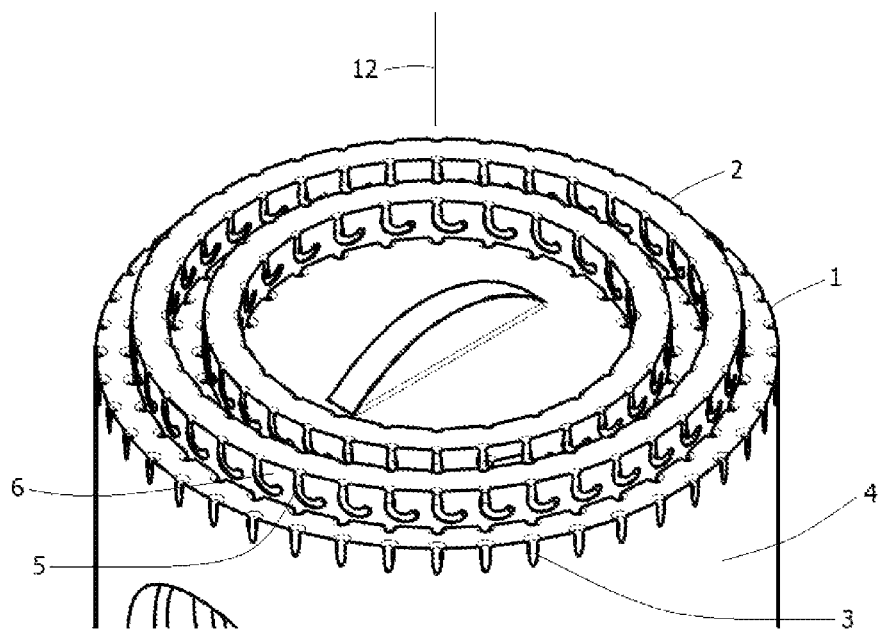

This U.S. utility patent application claims priority to European patent application No. 20192919.7, filed on Aug. 26, 2020, entitled "Apparatus for Producing a Hook-and-Loop Fastener Connector via an Injection Molding Method," and to European patent application No. 21170163.6, filed on Apr. 23, 2021, entitled "Hook-and-Loop Fastener Connector" the contents of which are incorporated herein by reference in their entireties.

The invention relates to an apparatus for producing a hook-and-loop fastener connector via injection molding, an injection molding method for producing a hook-and-loop fastener connector, and a hook-and-loop fastener connector. In a hook-and-loop fastener, a hook-and-loop fastener connector with a plurality of hooks makes contact with a loop element or respectively pile portion having loops or fibers, whereby the hooks interlock in the loops/fibers. A reversibly detachable connection is thereby established between the hook-and-loop fastener connector and the loop element.

This connection can be disengaged again by pulling the loop element from the hook-and-loop fastener connector. This reversibly detachable connection is used in many fields to releasably fasten articles or components. In motor vehicles, for example, floor mats on the floor of the vehicle are secured against slipping or raising by means of a hook-and-loop connection in that fastening means having a hook-and-loop fastener connector are anchored to the interior floor of the vehicle which, upon contact with a pile portion of a floor mat, enables the floor mat to be reversibly fixed to the vehicle floor.

A hook-and-loop connection in the form of a fastening device for a motor vehicle floor mat is thereby conventionally provided by a base body having a plurality of hooks being glued to an e.g. circular substrate by means of chemical or thermal adhesive bonds, for example solvent-based adhesives or hot-melt adhesives, and this substrate being fixed to the floor of the vehicle interior via fastening means. Apart from the environmental impact of solvent-based substances, neither the chemical nor the thermal adhesive bonds are satisfactory. Because there is the risk of the base body containing the plurality of hooks disengaging from the substrate when the temperature and/or the relative air humidity inside the vehicle is too high. There is furthermore also the risk of detachment after the floor mat has been in use for a long time and the base body with the plurality of hooks detaching from the substrate due to mechanical stress such as, for example, the foot movements of persons within the vehicle.

Alternatives to the above-described conventional bonding of the base body with the plurality of hooks onto a substrate are also known in the prior art.

WO 2014/191089 A1 discloses an injection mold and process in which a fastening part with adhesive and/or hooking elements forming a component of a contact fastener is produced and introduced into the injection mold as an insert part in a first step, and a substrate which connects to the insert part is formed using a foamed plastic material in a second step. Meaning that the insert part and the substrate of WO 2014/191089 are not formed as one piece.

DE 10 2009 054 896 A1 discloses a tool for producing a hook-and-loop disk via injection molding in which the hooks are formed together with the hook-and-loop disk in one step. In the thusly obtained hook-and-loop disk, the hooks are arranged vertically on the disk-shaped base plate of the hook-and-loop disk.

Due to this vertical arrangement, the hooks are formed with a hook head of approximately half the cross section of the hook foot as the hook head can only be formed in the second tool element of the tool because otherwise the first and second tool parts of the tool would not be displaceable against each other after the injection molding of the hook-and-loop disk.

The task of the present invention is that of providing an apparatus, a method as well as a hook-and-loop fastener connector which enables easy removal or expulsion respectively of the hooks of an injection molded hook-and-loop fastener connector within an injection mold. A further task of the present invention is that of providing a hook-and-loop fastener connector which ensures a particularly stable hook-and-loop connection to a pile portion.

This task is solved by a hook-and-loop fastener connector according to claim 1.

This task is in particular solved by an apparatus for producing a hook-and-loop fastener connector via an injection molding method, which comprises:

An injection mold having a plurality of first and second mold halves, wherein each first mold half exhibits a plurality of first cavities in a first surface and each second mold half exhibits a plurality of second cavities in a second surface, and the first and second surfaces face each other and contact such that the first and second cavity together form an entire cavity in hook form, wherein the hook form exhibits a hook foot and a hook head, and the hook foot and hook head are arranged within one plane, wherein the hook foot is formed at least by the first cavity and the hook head is formed at least by the second cavity, wherein the injection mold has a longitudinal axis along which the second mold halves are displaceable in relation to the first mold halves, characterized in that the plane and the longitudinal axis are angled to one another. The idea on which the invention is based is that of the first and second mold halves being formed in such a way that the plane within which the hook foot and the hook head of the hook form are arranged and the longitudinal axis of the injection mold are angled to one another. This firstly enables a hook injection molded in the injection mold to be easily removed/ejected from the first and second mold halves by displacing the second mold half relative to the first mold half along the longitudinal axis of the injection mold, and enables advantageous dimensioning to be provided to the hook head as well as an advantageous angled arrangement of the injection molded hooks on the hook-and-loop fastener connector.

The following will mostly make use of the singular form of the terms "hook form" and/or "hook," "mold half" and "surface," whereby one, or respectively one of the plurality, of "hook (forms)," "mold halves" or "surfaces" of the inventive apparatus is thereby meant as an example.

To be understood by the term "hook-and-loop fastener connector" as used herein is an object having a plurality of hooks, its hooks interlocking with a loop element or respectively pile portion exhibiting loops/fibers upon contact. A reversibly detachable connection is thereby established between the hook-and-loop fastener connector and the loop element.

To be understood by the term "hook head" as used herein is a structure which enables interlocking with a felt-like or fiber-like structure of a loop element or pile portion. Such a structure can be a curved or respectively round structure, for example a semicircular structure or a structure constituting less than a semicircle, e.g. a ⅓ circle, or more than a semicircle, e.g. a ⅝ circle. Alternatively, this structure can also exhibit an angled or respectively angular form such as, for example, an inverted V shape or an angular inverted U shape. Combinations of the aforementioned structures are also possible, e.g. inverted V or U shapes with circular rounded corners, or curved or respectively round structures complemented by linear elements such as, for example, a rounded inverted U shape. Preferentially, the hook head is ⅓ to ⅝ circular in shape. The hook forms can also be configured as double hooks, which is obtained by forming two hook heads on one hook foot, these hook feet pointing in 180° opposite directions.

To be understood by the term "hook foot" as used herein is a structure which connects the "hook head" to a base body, e.g. a base plate, of the hook-and-loop fastener connector. The "hook foot" is preferentially of straight structure. With a circularly curved hook head, the hook head begins where the curvature of the hook head begins. With an angled/angular form to the hook head, the hook foot ends and the hook head begins at a point where an imaginary line from the end of the hook head perpendicularly intersects the hook foot. However, the separation between hook head and hook foot by way of the above-described point is purely schematic. Because in three-dimensional form, part of the hook foot can fall below or exceed the height of this schematic separation point along the longitudinal direction of the hook foot, for example when the hook head is formed in the second cavity of the second mold half and the hook foot is formed in the first cavity of the first mold half and the second cavity of the second mold half.

To be understood by the term "longitudinal axis" of the injection mold as used herein is an axis along which the second mold halves are displaceable in relation to the first mold halves. Meaning that the first and second mold halves can be displaced on or parallel to the longitudinal axis of the injection mold. Preferably, the longitudinal axis of the injection mold is perpendicular to a surface of the injection mold which forms the side of a hook-and-loop fastener connector base plate on which the plurality of hooks is formed, whereby this surface is preferably formed entirely or partially by the third surfaces of the first mold halves and fourth surfaces of the second mold halves described below.

In addition to the special injection mold with its first and second mold halves, the apparatus comprises the usual devices of an injection molding device such as, for example, means for heating the plastic to be injected into injection mold, injection runners for the injection mold in order to force molten plastic into the injection mold, and means for appropriately opening/closing the injection mold. The plane in which the hook foot and the hook head of the hook form are arranged and the longitudinal axis of the injection mold are preferably angled to each other at an angle of up to 40°, further preferentially 5° to 30°, and particularly preferentially 10° to 20°. This preferential angling of the plane and longitudinal axis is advantageous because it enables more easily removing/ejecting the injection molded hooks from the first and second cavities and this choice of angle if necessary also enables the hook head of the hook form to be formed completely in the second cavity. The angles α specified in conjunction with the angled arrangement of the plane and the longitudinal axis to one another also include negative angles; i.e. angled −40° to each other, further preferentially −5° to −30° to each other, and particularly preferentially −10° to −20° to each other. Meaning that the hook forms can be formed in opposite directions within the first and second mold halves, thus once at a positive angle and once at a negative angle. It is preferential for the first and second surfaces of the plurality of first and second mold halves to be arranged parallel to each other, further preferentially parallel to the longitudinal axis. This parallel arrangement enables the first and second mold halves to each be configured in the same way; i.e. making the configuration/production of the first and second mold halves easier compared to a non-parallel arrangement. It is particularly advantageous for the first and second surfaces of the plurality of first and second mold halves to be arranged parallel to the longitudinal axis to one another. This enables both the first as well as the second mold half to be variably displaceable upwards or downwards in relation to one another along the longitudinal axis.

Preferably the hook foot is formed by the first and second cavity, and the hook head is formed by the second cavity. This has the advantage of the injection molded hook being easily removable, or demolded respectively, by the second mold half displacing relative to the first mold half, since the hook head is formed completely in the second cavity; i.e. displacement can press on the hook head, for example, in order to easily remove or respectively demold the injection molded hook. Further advantageous with this embodiment is that by the hook head only being formed in the second cavity, the hook head of the injection molded hook cannot block the displacement of the first and second mold halves relative to one another.

The hook head preferably has a cross section or a cross-sectional area equal to or greater than the cross section/cross-sectional area of the hook foot. This has the advantage of particularly stable injection molded hooks being able to be produced by means of the inventive apparatus since the dimensioning of the hook head has a significant influence on the stability of the hooking connection of the hook-and-loop fastener connector to a pile portion. Because if the cross section or cross-sectional area of the hook head is of smaller dimension than the hook foot, there is the risk that pulling on the pile portion will result in the hook heads of the hooks of the hook-and-loop fastener connector at least partly tearing away, thereby weakening the hooking connection.

To be understood by the term "injection mold" as used herein is an entire cavity in the form of a hook-and-loop fastener connector, wherein the plurality of first and second mold halves, the plurality of hooks of the hook-and-loop fastener connector, as well as the surface form a base body when the injection mold is injected with molten plastic. The injection mold has one or more injection runners enabling the injection mold to be filled with molten plastic. The base body of the hook-and-loop fastener connector can in principle be of any shape; preferentially, the base body is formed in the shape of a base plate; i.e. a planar body having a certain thickness on which the plurality of hooks are formed. The base body can optionally comprise fastening means which allows the base body with the plurality of hooks to be fixed to a further object. The "injection mold" can thus constitute an entire cavity which, in addition to the plurality of hooks formed by the plurality of first and second mold halves and the surface of the base body on which the plurality of hooks are formed, also represents the further shape of the base body with optional fastening means such that a hook-and-loop fastener connector with a plurality of hooks and a base body with optional fastening means can be formed in the injection mold in one piece.

The injection mold of the inventive apparatus is preferably designed such that the first mold half exhibits a third surface and the second mold half exhibits a fourth surface, the third surface being adjacent the first surface and the fourth surface being adjacent the second surface, whereby the third and fourth surface together form an opening constituting the cross section of the lower end of the hook foot. Preferentially, this opening leads to a further cavity in the form of a base plate of the hook-and-loop fastener connector so that when the injection mold is filled, a hook-and-loop fastener connector having a plurality of hooks formed on the base plate is obtained. This injection mold configuration is advantageous in order to produce a hook-and-loop fastener connector having a base plate on which a plurality of hooks is formed.

The further cavity in the form of a base plate of the hook-and-loop fastener connector can further comprise a cavity having the form of fastening means on a side opposite the third and fourth surfaces so that when the injection mold is filled, a hook-and-loop fastener connector having a plurality of hooks formed on the base plate is obtained, wherein the base plate is formed on the side of a fastening means opposite the side with the plurality of hooks.

It is preferential for the third surface to be perpendicular to the first surface and the fourth surface to be perpendicular to the second surface. This enables advantageously easy displaceability of the first and second mold halves relative to each other and thus also an advantageous removing or respectively expelling from the injection mold.

The second mold halves are preferably displaceable in the direction of the further cavity in the form of a base plate of the hook-and-loop fastener connector while the first mold halves maintain their position. This enables a particularly advantageous removal/demolding. Because if the further cavity in the form of a base plate is opened on the side opposite the first and second hook forms, the aforementioned displacement by the second mold halves can exert pressure on the injection molded hook heads and the injection molded base plate, whereby the hook foot of the injection molded hook is pushed out of the first cavity.

In the apparatus according to the invention, at least one first mold half preferentially exhibits a respective first surface on two opposite sides, and at least one second mold half exhibits a respective second surface on two opposite sides. This configuration enables the inventive apparatus to provide a hook-and-loop fastener connector having a high density of hooks.

The third and fourth surfaces are preferably planar. This enables the production of a hook-and-loop fastener element having a planar base plate.

The first and second surfaces are preferably planar. This enables a simple design and manufacture of the first and second mold halves and easy displaceability of the first and second mold halves relative to one another.

It is preferential for the second cavities to be formed such that each of the ends of the hook head forms exhibit the same orientation.

The first and second mold halves are preferably arranged concentrically to one another, further preferentially circularly concentric to one another. The advantage of such a concentric arrangement is that when the concentric first and second mold halves are removed or expelled by the displacement of the concentric first and second mold halves against each other, there is a relatively even distribution of forces pressing on the injection molded hook heads or the injection molded base plate.

When the first and second mold halves are arranged circularly concentric to one another, it is then preferential for all the second cavities to be formed such that all the hook head forms are essentially tangential to the circular form of the second mold half and each of the ends of the hook head forms exhibit the same orientation. In this context, "essentially tangential" means that the plane within which the hook foot and hook head are arranged is perpendicular or respectively at a tolerance of ±5° to a contact radius of the second mold half. When a first mold half has a respective first surface on two opposite sides and a second mold half has a respective second surface on two opposite sides, said respectively same orientation can either be the same or opposite on both opposite sides, preferentially opposite. If the opposite sides of the first mold half and second mold half exhibit respectively opposite orientations with respect to the hook forms, a hook-and-loop fastener connector is obtained with the inventive apparatus in which the plurality of circularly concentrically arranged hooks have the same orientation in a circle to the ends of the hook heads tangential to the circular shape while in a circle adjacent to this circle of hooks, the ends of the hook heads tangential to the circular shape exhibit an orientation which is opposite to that of the adjacent circle. This circular concentric arrangement of the hooks, in which the hook heads of the adjacent circles each have an opposite tangential orientation to the circular shape, is also referred to herein as "circularly concentric to each other." This arrangement enables a particularly advantageous stable hooking connection to a pile portion.

According to one preferential embodiment, the second mold half is formed in such a way that the hook head is shaped as a double hook head, its hook heads pointing in 180° opposite directions. This has the advantage of being able to form a hook having two hook heads, whereby the stability of the hooking connection is virtually doubled compared to hooks having only one hook head.

The cross section or respectively cross-sectional area of the hook foot and/or hook head can in principle be of any shape, for example polygonal such as e.g. triangular, rectangular, pentagonal or hexagonal, essentially circular, or a mixed form of polygonal and essentially circular, e.g. a polygonal cross section with rounded corners. It is preferential for the cross section/cross-sectional area of the hook foot and/or hook head to be essentially circular. Meant here by "essentially circular" is circular, of circular segmented shape or oval, whereby it is preferential for the cross section of the hook foot and/or hook head to be of circular or circular segmented shape. A hook head cross section of circular segmented shape can be formed by, for example, the circular arc of the circle segment being formed by the second cavity of the second mold half and the circle chord of the circle segment by a planar first surface of the first mold half. The opening formed jointly by the third and fourth surface is preferentially circular and the third surface forms a circle segment of 60-80% of the circular area of the opening and the fourth surface forms a circle segment of 20-40% of the circular area of the opening, under the condition that the total circular area of the opening amounts to 100%. This advantageous configuration of the third and fourth surfaces enables a larger part of the hook foot cross section to be formed in the first mold half while the second mold half forms a smaller part of the hook foot cross section.

The dimensions of the hook form defined below are selected in such a way that an injection molded hook can be easily demolded/removed from the first or respectively second mold half without being damaged, e.g. by tearing away the hook head. The following defined hook form dimensions further enable obtaining a hook by injection molding which ensures an advantageously stable hook-and-loop connection to a pile portion.

The first and second mold half, in particular the first cavity of the first mold half and the second cavity of the second mold half, are preferentially dimensioned such that the circular cross section of the hook foot exhibits a diameter of from 0.3 to 0.8 mm, further preferentially 0.4 to 0.7 mm, particularly preferentially 0.45 to 0.6 mm.

It is furthermore preferential for the first and second mold halves to be dimensioned such that the hook head exhibits a diameter equal to or greater than the diameter of the hook foot, preferably the hook head is up to 25% greater in diameter than the hook foot, preferentially 4% to 22% greater, further preferentially 6 to 18% greater, particularly preferentially 8 to 12% greater. If the hook head is not of circular cross section but rather circular segmented shape, the diameter of the hook head's cross section of circular segmented shape is then selected such that the hook head's cross section/cross-sectional area of circular segmented shape is at least equal to or preferably greater than the circular cross section/cross-sectional area of the hook foot.

It is furthermore preferential for the first and second mold halves to be dimensioned such that the hook form is 1.2 to 4 mm in height from the hook foot to the hook head, further preferentially 1.5 to 3 mm, particularly preferentially 1.8 to 2.5 mm. This height from the hook foot to the hook head is measured vertically from the third and fourth surfaces to the highest point of the hook head of the hook form.

The further cavity in the form of a base plate of the hook-and-loop fastener connector is preferably circular and exhibits a diameter of 5 to 10 cm and a thickness of 1 to 5 mm, further preferentially a diameter of 6 to 8.5 cm and a thickness of 1.5 to 4 mm, and particularly preferentially a diameter of 6 to 7.5 cm and a thickness of 2 to 3 mm. The thickness of the circular base plate as specified here is understood to be without the optional fastening means which can be arranged on the side opposite the side with the plurality of hooks.

It is preferential for the hook-and-loop fastener connector to be a fastening device for a motor vehicle floor mat. Preferential configurations of a fastening device for a motor vehicle floor mat are discussed in the description of the hook-and-loop fastener connector according to the invention.

According to one particularly preferential embodiment, an apparatus is provided for producing a hook-and-loop fastener connector via an injection molding method, which comprises the following:

An injection mold having a plurality of first and second mold halves, wherein each first mold half exhibits a plurality of first cavities in a first surface and each second mold half exhibits a plurality of second cavities in a second surface, and the first and second surfaces face each other and contact such that the first and second cavity together form an entire cavity in hook form, wherein the hook form exhibits a hook foot and a hook head, and the hook foot and hook head are arranged within one plane, wherein the hook foot is formed by the first and second cavity and the hook head is formed by the second cavity, wherein the injection mold has a longitudinal axis along which the second mold halves are displaceable in relation to the first mold halves, wherein the first and second surfaces of the plurality of first and second mold halves are arranged parallel to each other and parallel to the longitudinal axis, characterized in that the plane and the longitudinal axis are angled to one another at an angle α of 5° to 30°, preferentially 10° to 20°, the second cavity is preferentially dimensioned such that the hook head exhibits a cross section equal to or greater than the cross section of the hook foot, and the first and second mold halves are preferentially arranged circularly concentric to one another. The above-cited particularly preferential embodiment of the inventive apparatus further optionally comprises:

The first mold half exhibiting a third surface and the second mold half a fourth surface, the third surface being adjacent the first surface and the fourth surface being adjacent the second surface, whereby the third and fourth surface together form an opening constituting the cross section of the lower end of the hook foot, wherein this opening leads to a further cavity in the form of a base plate of the hook-and-loop fastener connector so that when the injection mold is filled, a hook-and-loop fastener connector having a plurality of hooks formed on the base plate is obtained, wherein the third surface is perpendicular to the first surface and the fourth surface is perpendicular to the second surface, and the third and fourth surfaces are planar.

The invention moreover relates to an injection molding method for producing a hook-and-loop fastener connector using the inventive apparatus. The advantages of this injection molding method stem from the advantages of the apparatus as already explained above.

In terms of process parameters such as the temperature(s) for melting a starting plastic and injection molding into the injection mold as well as in terms of the choice of plastic, the injection molding method according to the invention does not differ from conventional injection molding processes. For example, a plastic from the group consisting of polyamides, polyalkylenes and thermoplastic copolymers can be selected as the starting plastic, preferentially the plastic is selected from the polyamide, polyethylene, polypropylene and acrylonitrile-butadiene-styrene (ABS) group, further preferentially polyamide or polyethylene, particularly preferentially polyamide 56. The process temperature(s) is/are selected as a function of the type of plastic being used.

In the inventive injection molding method, the hook-and-loop fastener connector is preferably molded in one piece in the injection mold. That means that the hook-and-loop fastener connector can be formed in one step. This has the advantage of further steps not being required in order to attach the plurality of hooks to a base body, e.g. in the form of a base plate, and/or attach optional fastening means to the base body.

The method according to the invention preferentially comprises the following steps:
a) injecting molten plastic into the injection mold;
b) cooling the molten plastic in the injection mold until the plastic is solid;
c) longitudinally displacing the second mold halves along the injection mold toward a base plate of the hook-and-loop fastener connector on which the hooks are formed in order to remove the hook feet from the first mold halves.

The inventive apparatus used in the inventive method comprises an injection mold with first and second mold halves which are designed such that the plane within which the hook foot and the hook head of the hook form are arranged and the longitudinal axis of the injection mold are angled to each other. This facilitates demolding or expulsion step c), because the pressure exerted on the hook head by the displacing of the second mold halves thereby allows the hook feet to be easily pushed out or removed from the injection mold. Depending on the design of the injection mold, the injection mold can be opened in the direction of the further cavity in the form of a base plate between steps b) and c) in order to enable the second mold halves to displace toward the base plate of the injection molded hook-and-loop fastener connector. Alternatively, the apparatus or injection mold respectively can comprise a mechanism which allows displacement of the second mold halves in step c) without the injection mold needing to be opened prior to step c), e.g. a mechanism which enables the injection mold to be opened in the direction of the further cavity in the form of a base plate via displacement of the second mold halves in that the second mold halves exert pressure on the injection molded base plate and the injection mold thus opens, e.g. by means of a spring-loaded mechanism.

The method according to the invention preferably further comprises the following step:
d) pulling on the base plate of the hook-and-loop fastener connector so as to pull out the hook heads located in the second mold halves.

While the hook feet are pushed out or respectively demolded by means of step c), step d) serves the demolding of the hook heads. Pulling on the base plate of the hook-and-loop fastener connector in step d) can be effected by any suitable means. The crucial advantage with step d) is that due to the injection mold with first and second mold halves designed such that the plane within which the hook foot and the hook head of the hook form are arranged and the longitudinal axis of the injection mold are angled to each other, the hook heads can be easily pulled out of the second mold halves without being damaged in the process.

The invention furthermore relates to a hook-and-loop fastener connector having a plurality of hooks arranged on a base plate, whereby the hooks exhibit a hook foot and a hook head and the hook foot and hook head are arranged within one plane, characterized in that the plane and the base plate are angled to each other at an angle ß greater than 90°. Conventional hook-and-loop fastener connectors have hooks which, due to their manufacturing process, are formed on a base body at a 90° angle. The present inventors have now surprisingly found that an angle greater than 90° not only offers advantages relative to the apparatus for the manufacturing and injection molding process but in fact that an angle greater than 90° also ensures an advantageous, particularly stable hook-and-loop connection to a pile portion.

The hook-and-loop fastener connector can preferably be obtained via the above-described inventive method. Doing so enables producing the hook-and-loop fastener connector with the previously cited advantages as were noted in conjunction with the inventive apparatus and inventive method.

The angle ß between the imaginary plane, within which the hook foot and hook head are arranged, and the base plate of the inventive hook-and-loop fastener connector corresponds to the angle α between the plane and the longitudinal axis of the injection mold of the inventive apparatus when the hook-and-loop fastener connector according to the invention is produced by way of the inventive method. For example, angle β is equal to angle α plus 90° when the third surface is perpendicular to the first surface in the first mold half and the fourth surface is perpendicular to the second surface in the second mold half; i.e. at angle α=15°, then angle ß=15°+90°=105°. Thus, the angling at an angle β of greater than 90° in the inventive hook-and-loop fastener connector shows that it was produced by means of the inventive method or inventive apparatus respectively.

It is preferential for the plane and the base plate to be angled to one another at an angle ß greater than 90° to 130°, further preferentially 95° to 120°, and particularly preferentially 100° to 110° in the inventive hook-and-loop fastener connector. It was surprisingly found that an angle ß of 95° to 120°, and particularly an angle of 100° to 110°, is particularly advantageous with respect to the stability of the hook-and-loop connection to a pile portion. The angles specified in conjunction with the angled arrangement of the plane and the base plate to one another also include negative angles; i.e. angles that are angled more than −90° to −130° to each other, preferentially more than −95° to −120°, and particularly preferentially more than −100° to −110°. The plurality of hooks arranged on the base plate can thereby also be formed in opposite directions, thus once at a positive angle and once at a negative angle.

The inventive hook-and-loop fastener connector is in principle suitable for any application such as, for example, in the leisure sector, in households or in industrial settings, e.g. the automotive sector. The hook-and-loop fastener connector can to that end be of any form suitable for the desired application; particularly the shape and the dimensioning of the hook as well as the shape of the base plate are suitably selected accordingly, and fastening means optionally attached to the base plate can also be suitably selected depending on the area of application.

The plurality of hooks can be circularly concentrically arranged on the base plate in the inventive hook-and-loop fastener connector, preferentially circularly concentric to each other.

The inventive hook-and-loop fastener connector is preferably a fastening device for a motor vehicle floor mat, the preferential embodiment of which is explained below.

The hook-and-loop fastener connector is preferably a fastening device for a motor vehicle floor mat which comprises fastening means preferentially on the side of the base plate opposite the side with the plurality of hooks for fixing the base plate to the floor of a motor vehicle's interior, whereby the base plate, the plurality of hooks and the fastening means are formed in one piece. The one-piece formation of the hook-and-loop fastener connector has the advantage of the plurality of the hooks as well as the fastening means being an integral part of the hook-and-loop fastener connector, whereby both the hooking connection to a pile portion as well as the fixing to the motor vehicle's interior floor is considerably more stable than is the case with a hook-and-loop fastener connector in which the plurality of hooks and/or the fastening means are separate components subsequently attached to the base plate.

The fastening means can in principle be of any form as long as it is suitable for affixing the base plate to the floor of a motor vehicle's interior. The fastening means is preferentially in the form of a screw or a T-shaped anchoring element. The dimensions of the hook, base plate and optional fastening means of the hook-and-loop fastener connector according to the invention can be appropriately selected depending on the area of application.

The hook-and-loop fastener connector preferably exhibits hooks having a hook foot of circular cross section at a diameter of 0.3 to 0.8 mm, further preferentially 0.4 to 0.7 mm, particularly preferentially 0.45 to 0.6 mm. The hook head of the hook of the hook-and-loop fastener connector is furthermore preferably designed such that the hook head has a diameter equal to or greater than the diameter of the hook foot, preferably the hook head is up to 25% greater in diameter than the hook foot, preferentially 4% to 22% greater, further preferentially 6 to 18% greater, particularly preferentially 8 to 12% greater. If the hook head is not of circular cross section but rather circular segmented shape, the diameter of the hook head's cross section of circular segmented shape is then selected such that the hook head's cross section/cross-sectional area of circular segmented shape is at least equal to or preferentially greater than the circular cross section/cross-sectional area of the hook foot. This dimensioning of the hook foot and/or hook head contributes to a stable hook-and-loop connection to a pile portion.

Particularly the dimensioning of the hook head to the same or larger diameter/cross section as the hook foot contributes to a particularly stable hook-and-loop connection to a pile portion. Because if one tries to disengage a hook-and-loop/pile portion connection, a higher pull-off force is required for the hook head because, among other things, the hook head is more stable due to the advantageous dimensioning and tears away from the hook foot much less easily than a hook head having a smaller diameter than the hook foot.

The hooks of the hook-and-loop fastener connector are preferably 1.2 to 4 mm in height from the hook foot to the hook head, preferentially 1.5 to 3 mm, particularly preferentially 1.8 to 2.5 mm. This height from the hook foot to the hook head is measured vertically from the base plate to the highest point of the hook head.

It is preferential for the base plate of the hook-and-loop fastener connector to be circular and exhibit a diameter of 5 to 10 cm and a thickness of 1 to 5 mm, preferentially a diameter of 6 to 8.5 cm and a thickness of 1.5 to 4 mm, particularly preferentially a diameter of 6 to 7.5 cm and a thickness of 2 to 3 mm. The aforementioned thickness of the base plate only relates to the base plate itself, meaning that the plurality of hooks arranged thereon as well as the optional fastening means do not factor into this height. This preferential dimensioning of the base plate ensures advantageous stability for the base plate, particularly for the intended application as a fastening device for a motor vehicle floor mat.

It is preferential for the fastening means to be 0.4 to 3 cm in length measured from the base plate, further preferentially 0.8 to 2.4 cm, particularly preferentially 1.2 to 1.8 cm. This thereby ensures an advantageously stable fixing of the inventive hook-and-loop fastener connector, e.g. to the floor of a motor vehicle's interior.

The hook head is preferably designed as a double hook head, its hook heads pointing in 180° opposite directions. This has the advantage of virtually doubling the stability of the hooking connection compared to hooks having only one hook head.

Figure 2:
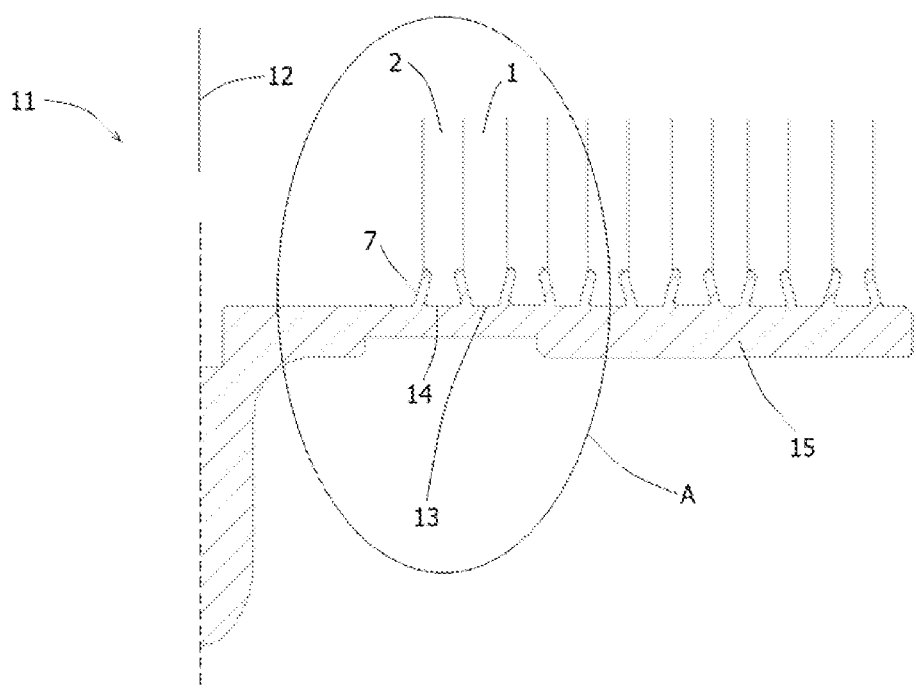
Figure 3:
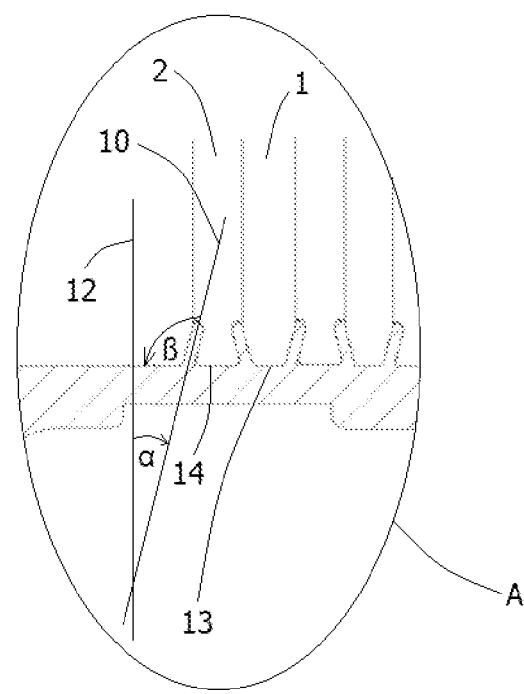
Figure 4:
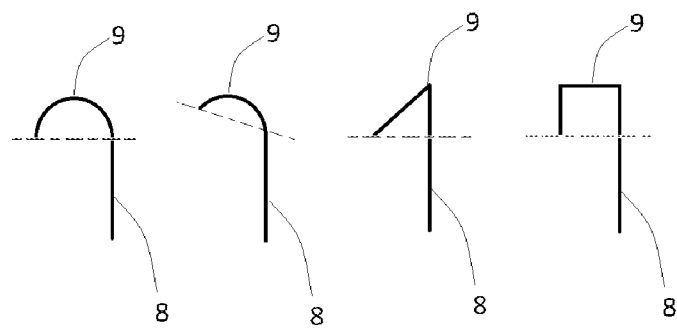
Figure 5:
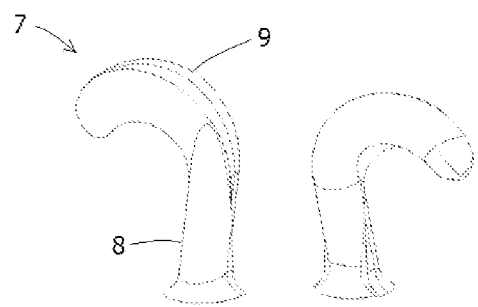
Figure 6:
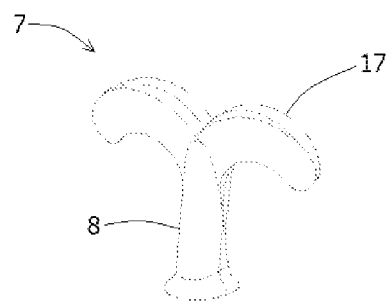
Figure 7:
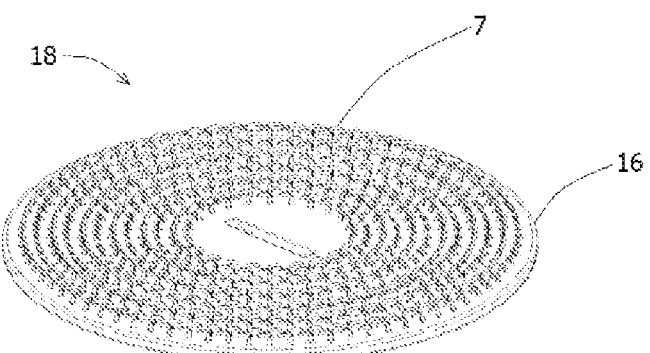
Figure 8:
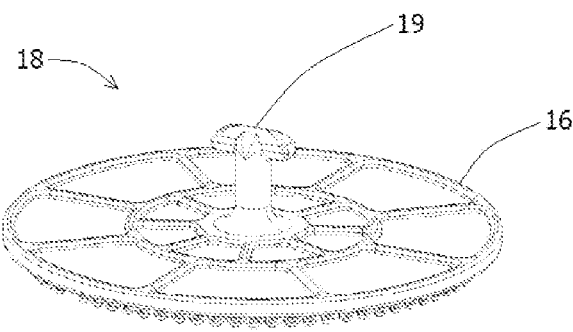

Provided according to one particularly preferential embodiment is a hook-and-loop fastener connector having a plurality of hooks arranged on a base plate, wherein the hooks exhibit a hook foot and a hook head and the hook foot and hook head are arranged within one plane, characterized in that the plane and the base plate are angled to each other at an angle ß of 95° to 120°, preferentially 100° to 110°; the hooks preferably exhibit a hook head having a diameter equal to or greater than the diameter of the hook foot, and the plurality of hooks are preferentially arranged circularly concentrically on the base plate. The following will reference the accompanying schematic drawings in describing the invention in greater detail on the basis of an exemplary embodiment. Shown are:

FIG. 1: a top view from diagonally above onto the plurality of first and second mold halves of the inventive apparatus, wherein the first and second mold halves here are displaced relative to one another along the longitudinal axis of the injection mold;

FIG. 2: a half cross-sectional view of the injection mold of the inventive apparatus, whereby in contrast to FIG. 1, the first and second surfaces face each other and contact such that the first and second cavity together form an entire cavity in hook form. The dashed line indicates where the cross section of the injection mold was halved—mirroring the half cross-sectional view against the dashed line provides the full cross-sectional view of the injection mold;

FIG. 3: a detail view of the encircled section A shown in FIG. 2;

FIG. 4: side views of schematically depicted hook forms;

FIG. 5 two side views of a particularly preferential hook formed by an entire cavity in hook form as formed by the first and second cavity together;

FIG. 6: a side view of a preferential hook having a double hook head;

FIG. 7: a top view from diagonally above onto the hook-and-loop disk of a preferential hook-and-loop fastener connector; and FIG. 8: a top view from diagonally above onto the lower portion of the preferential hook-and-loop fastener connector.

FIG. 1 shows a preferential embodiment of the inventive apparatus depicting a plurality of first mold halves 1 and second mold halves 2 which are arranged circularly concentric to one another. The second mold halves 2 here are displaced along the longitudinal axis 12 of the injection mold 11 in relation to the first mold halves; i.e. in demolding or respectively expulsion position. To produce the hook-and-loop fastener connector, the first mold halves 1 and second mold halves 2 are arranged in such a manner (not shown in FIG. 1) that the plurality of first cavities 3 in a first surface 4 of the first mold half 1 and the plurality of second cavities 5 in a second surface 6 of the second mold half 2 face each other and contact so that the first cavity 3 and second cavity 5 together form an entire cavity in hook form 7. The hook foot 8 here is formed by the first cavity 3 and second cavity 5 and the hook head 9 is formed by the second cavity 5.

It is evident from FIGS. 2 and 3 how the (imaginary) plane 10 within which the hook foot 8 and hook head 9 are arranged and the longitudinal axis 12 of the injection mold 11 are angled to one another, in this example case at an angle α of 15°. FIG. 3 depicts the plane 10 as a simple line because plane 10 is being viewed from the side here. In the apparatus depicted here, the first mold half 1 exhibits a third surface 13 and the second mold half 2 a fourth surface 14, the third surface 13 being adjacent the first surface 4 and the fourth surface 14 being adjacent the second surface 6. The third surface 13 and fourth surface 14 together form an opening which constitutes the cross section of the lower end of the hook foot 8. This opening leads to a further cavity 15 in the form of a base plate 16 of the hook-and-loop fastener connector so that when the injection mold is filled, a hook-and-loop fastener connector having a plurality of hooks formed on the base plate is obtained. The further cavity 15 in the form of a base plate 16 of the hook-and-loop fastener connector shown here is furthermore configured with a cavity in the form of a fastening means 19. Due to the angling of the plane 10 and longitudinal axis 12 to one another 12, hooks 7 are provided on the base plate during injection molding at an angle ß. Since the third surface 13 is perpendicular to the first surface 4 and the fourth surface 14 is perpendicular to the second surface 6 in the present example, angle ß here is equal to angle α plus 90°, thus angle ß=105°.

FIG. 4 shows side views of schematically depicted hook forms, specifically from left to right: hook forms 7 with hook heads 9 in semicircular form, ⅔ semicircular form, angled in an inverted V shape and in an angular inverted U shape.

The dashed line shows the schematic separation between hook head 9 and hook foot 8. In semicircular or circular form, the hook head 9 begins (and the hook foot 8 ends) at the circular curvature of the hook head. In the inverted V shape and angular U shape, the hook foot 8 ends and the hook head 9 begins at the point where the dashed line, running from the end of the hook head, perpendicularly intersects the hook foot. However, the separation between hook head and hook foot shown here is purely schematic. Because in three-dimensional form, part of the hook foot can fall below or exceed the height of the separation point along the longitudinal direction of the hook foot shown in FIG. 4.

FIG. 5 shows a preferential hook (form) 7 having a hook foot 8 and a hook head 9, and that in two side views of the hook (form) 7. The hook foot 8 here exhibits a circular cross section and the hook head 9 exhibits an essentially circular cross section of circular segmented shape. Evident from the hook form on the left is that a part of the hook foot 8 formed by the first mold half extends beyond the point at which the hook head 9 begins to curve.

FIG. 6 shows an example of a hook (form) 7 having a double hook head 17.

FIG. 7 shows a preferential embodiment of the hook-and-loop fastener connector 18 in the form of a fastening device for a motor vehicle floor mat, and specifically its upper side exhibiting a plurality of hooks 7 on the base plate 16. The hooks 7 here are arranged in a circular concentric manner, whereby the orientation of the hook head forms is opposite from one concentric ring of hooks 7 to the adjacent concentric ring of hooks 7; i.e. the hooks are arranged against each other in a circle.

FIG. 8 shows the underside of the hook-and-loop fastener connector 18 shown in FIG. 7 which comprises a fastening means 19 as a T-shaped anchoring element.

The preferential aspects of the present disclosure can be summarized as follows:

1. An apparatus for producing a hook-and-loop fastener connector via an injection molding method, which comprises:
   an injection mold having a plurality of first and second mold halves, wherein each first mold half exhibits a plurality of first cavities in a first surface and each second mold half exhibits a plurality of second cavities in a second surface, and the first and second surfaces face each other and contact such that the first and second cavity together form an entire cavity in hook form,
   wherein the hook form exhibits a hook foot and a hook head, and the hook foot and hook head are arranged within one plane, wherein the hook foot is formed at least by the first cavity and the hook head is formed at least by the second cavity,
   wherein the injection mold has a longitudinal axis along which the second mold halves are displaceable in relation to the first mold halves,
   characterized in that the plane and the longitudinal axis are angled to one another.
2. The apparatus according to aspect 1 having at least one of the following features:
   the plane and the longitudinal axis are angled to each other at an angle (α) of up to 40°, preferentially 5° to 30°, particularly preferentially 10° to 20°;
   the first and second surfaces of the plurality of first and second mold halves are arranged parallel to each other, preferentially parallel to the longitudinal axis;
   the hook foot is formed by the first and second cavity and the hook head is formed by the second cavity;
   the second cavity is dimensioned such that the hook head exhibits a cross section which is equal to or greater than the cross section of the hook foot;
   at least one first mold half exhibits a respective first surface on two opposite sides and at least one second mold half exhibits a respective second surface on two opposite sides;
   the second mold half is configured such that the hook head is shaped as a double hook head, its hook heads pointing in 180° opposite directions;
   the cross section of the hook foot and/or hook head is essentially circular.
3. The apparatus according to aspect 1 or 2,
   wherein the first mold half exhibits a third surface and the second mold half exhibits a fourth surface, and
   the third surface is adjacent the first surface and the fourth surface is adjacent the second surface,
   whereby the third and fourth surface together form an opening constituting the cross section of the lower end of the hook foot;
   this opening preferentially leading to a further cavity in the form of a base plate of the hook-and-loop fastener connector so that when the injection mold is filled, a hook-and-loop fastener connector having a plurality of hooks formed on the base plate is obtained.
4. The apparatus according to aspect 3 having at least one of the following features:
   the third surface is perpendicular to the first surface and the fourth surface is perpendicular to the second surface;
   the second mold halves are displaceable in the direction of the further cavity in the form of a base plate of the hook-and-loop fastener connector while the first mold halves maintain their position;
   the third and fourth surfaces are planar.
5. The apparatus according to one of the preceding aspects, wherein the first and second surfaces are planar and the second cavities are preferentially formed such that each of the ends of the hook head forms exhibit the same orientation.
6. The apparatus according to one of aspects 1 to 4, wherein the first and second mold halves are arranged concentrically to one another.
7. The apparatus according to aspect 6, wherein the first and second mold halves are arranged circularly concentric to one another and all the second cavities are preferentially formed such that all the hook head forms are essentially tangential to the circular form of the second mold half and each of the ends of the hook head forms exhibit the same orientation.
8. The apparatus according to one of aspects 3 to 7,
   wherein the opening is circular and the third surface forms a circle segment of 60-80% of the circular area of the opening and the fourth surface forms a circle segment of 20-40% of the circular area of the opening, under the condition that the total circular area of the opening amounts to 100%; and/or
   the first and second mold half are dimensioned such that the hook head exhibits a diameter equal to or greater than the diameter of the hook foot, whereby the hook head is preferably up to 25% greater in diameter than the hook foot, further preferentially 4% to 22% greater, even further preferentially 6 to 18% greater, particularly preferentially 8 to 12% greater.
9. An injection molding method for producing a hook-and-loop fastener connector using an apparatus according to one of aspects 1 to 8.

10. The injection molding method according to aspect 9, wherein the hook-and-loop fastener connector is molded in one piece in the injection mold.

11. The injection molding method according to aspect 9 or 10, comprising the following steps a) to c), and optionally step d):
    a) injecting molten plastic into the injection mold;
    b) cooling the molten plastic in the injection mold until the plastic is solid;
    c) longitudinally displacing the second mold halves along the injection mold toward a base plate of the hook-and-loop fastener connector on which the hooks are formed in order to remove the hook feet from the first mold halves;
    d) pulling on the base plate of the hook-and-loop fastener connector so as to pull out the hook heads located in the second mold halves.

12. A hook-and-loop fastener connector having a plurality of hooks arranged on a base plate,
    wherein the hooks exhibit a hook foot and a hook head, and
    the hook foot and hook head are arranged within one plane,
    characterized in that the plane and the base plate are angled to each other at an angle (ß) greater than 90°.

13. The hook-and-loop fastener connector according to aspect 12,
    wherein the plane and the base plate are angled to one another at an angle (ß) greater than 90° to 130°, further preferentially 95° to 120°, and particularly preferentially 100° to 110°; and/or
    the hook-and-loop fastener connector is obtainable by the method according to one of aspects 9 to 11.

14. The hook-and-loop fastener connector according to aspect 12 or 13,
    wherein the inventive hook-and-loop fastener connector is a fastening device for a motor vehicle floor mat which comprises at least one of the following features:
    a fastening means on the side of the base plate opposite the side with the plurality of hooks, whereby the fastening means serves to fix the base plate to the floor of a motor vehicle's interior, and the base plate, the plurality of hooks and the fastening means are formed in one piece;
    a fastening means in the form of a screw or a T-shaped anchoring element;
    a fastening means of 0.4 to 3 cm in length measured from the base plate, preferentially 0.8 to 2.4 cm, particularly preferentially 1.2 to 1.8 cm.

15. The hook-and-loop fastener connector according to one of aspects 12 to 14, comprising at least one of the following features:
    the plurality of hooks are arranged circularly concentrically on the base plate;
    each hook exhibits a hook foot of circular cross section at a diameter of 0.3 to 0.8 mm, preferentially 0.4 to 0.7 mm, particularly preferentially 0.45 to 0.6 mm;
    each hook exhibits a hook head having a diameter equal to or greater than the diameter of the hook foot, preferably up to 25% greater in diameter than the hook foot, further preferentially 4% to 22% greater, even further preferentially 6 to 18% greater, particularly preferentially 8 to 12% greater;
    each hook is 1.2 to 4 mm in height from the hook foot to the hook head, preferentially 1.5 to 3 mm, particularly preferentially 1.8 to 2.5 mm;
    the base plate of the hook-and-loop fastener connector is circular and exhibits a diameter of 5 to 10 cm and a thickness of 1 to 5 mm, preferentially a diameter of 6 to 8.5 cm and a thickness of 1.5 to 4 mm, particularly preferentially a diameter of 6 to 7.5 cm and a thickness of 2 to 3 mm.

LIST OF REFERENCE NUMERALS

1 first mold half
2 second mold half
3 first cavity
4 first surface of first mold half
5 second cavity
6 second surface of second mold half
7 hook (form)
8 hook foot
9 hook head
10 plane within which the hook foot and hook head are arranged
11 injection mold
12 longitudinal axis
13 third surface of first mold half
14 fourth surface of second mold half
15 further cavity in the form of a base plate of the hook-and-loop fastener connector
16 base plate of the hook-and-loop fastener connector
17 double hook head
18 hook-and-loop fastener connector in the form of a fastening device for a motor vehicle floor mat
19 fastening means of base plate 16
A detail from FIG. 2
α angle between plane 10 and longitudinal axis 12
ß angle between plane 10 and base plate 16

The invention claimed is:

1. A hook-and-loop fastener connector having a plurality of hooks arranged on a base plate, wherein the hooks exhibit a hook foot and a hook head, and the hook foot and hook head are arranged within one plane, characterized in that the plane and the base plate are angled to each other at an angle (ß) greater than 90°.

2. The hook-and-loop fastener connector according to claim 1, wherein the plane and the base plate are angled to one another at an angle (ß) greater than 90° to 130°.

3. The hook-and-loop fastener connector according to claim 1, wherein the hook-and-loop fastener connector is a fastening device for a motor vehicle floor mat which has at least one of the following features:
    a fastening means on the side of the base plate opposite the side with the plurality of hooks, wherein the fastening means serves to fix the base plate to the floor of a motor vehicle's interior, and the base plate, the plurality of hooks and the fastening means are formed in one piece;
    a fastening means in the form of a screw or a T-shaped anchoring element;
    a fastening means of 0.4 to 3 cm in length measured from the base plate.

4. The hook-and-loop fastener connector according to claim 1 which comprises at least one of the following features:
    the plurality of hooks are arranged circularly concentrically on the base plate;
    each hook exhibits a hook foot of circular cross section at a diameter of 0.3 to 0.8 mm;
    each hook exhibits a hook head having a diameter equal to or greater than the diameter of the hook foot;

each hook is 1.2 to 4 mm in height from the hook foot to the hook head;

the base plate of the hook-and-loop fastener connector is circular and exhibits a diameter of 5 to 10 cm and a thickness of 1 to 5 mm.

5. The hook-and-loop fastener connector according to claim 1 obtainable by injection molding with an apparatus for producing the hook-and-loop fastener connector via an injection molding method, which comprises:

an injection mold having a plurality of first and second mold halves, wherein each first mold half exhibits a plurality of first cavities in a first surface and each second mold half exhibits a plurality of second cavities in a second surface, and the first and second surfaces face each other and contact such that the first and second cavity together form an entire cavity in hook form, wherein the hook foot is formed at least by the first cavity and the hook head is formed at least by the second cavity, wherein the injection mold has a longitudinal axis along which the second mold halves are displaceable in relation to the first mold halves, and wherein the plane and the longitudinal axis are angled to one another.

6. The hook-and-loop fastener connector according to claim 5, wherein the apparatus for producing the hook-and-loop fastener connector has at least one of the following features:

the plane and the longitudinal axis are angled to each other at an angle (α) of up to 40°;

the first and second surfaces of the plurality of first and second mold halves are arranged parallel to each other;

the hook foot is formed by the first and second cavity and the hook head is formed by the second cavity;

the second cavity is dimensioned such that the hook head exhibits a cross section equal to or greater than the cross section of the hook foot;

at least one first mold half exhibits a respective first surface on two opposite sides and at least one second mold half exhibits a respective second surface on two opposite sides;

the second mold half is configured such that the hook head is shaped as a double hook head, its hook heads pointing in 180° opposite directions;

the cross section of the hook foot and/or hook head is essentially circular.

7. The hook-and-loop fastener connector according to claim 5, wherein the first mold half of the apparatus for producing the hook-and-loop fastener connector exhibits a third surface and the second mold half exhibits a fourth surface, and the third surface is adjacent the first surface and the fourth surface is adjacent the second surface, wherein the third and fourth surface together form an opening constituting the cross section of the lower end of the hook foot.

8. The hook-and-loop fastener connector according to claim 7, wherein the apparatus for producing the hook-and-loop fastener connector has at least one of the following features:

the third surface is perpendicular to the first surface and the fourth surface is perpendicular to the second surface;

the second mold halves are displaceable in the direction of the further cavity in the form of a base plate of the hook-and-loop fastener connector while the first mold halves maintain their position;

the third and fourth surfaces are planar.

9. The hook-and-loop fastener connector according to claim 7, wherein the opening jointly formed by the third and fourth surfaces of the apparatus for producing the hook-and-loop fastener connector is circular and the third surface forms a circle segment of 60-80% of the circular area of the opening and the fourth surface forms a circle segment of 20-40% of the circular area of the opening, under the condition that the total circular area of the opening amounts to 100%; and/or the first and second mold half of the apparatus for producing the hook-and-loop fastener connector are dimensioned such that the hook head exhibits a diameter equal to or greater than the diameter of the hook foot.

10. The hook-and-loop fastener connector according to claim 5, wherein the first and second surfaces of the apparatus for producing the hook-and-loop fastener connector are planar, or wherein the first and second surfaces of the apparatus for producing the hook-and-loop fastener connector are arranged concentrically to one another.

11. The hook-and-loop fastener connector according to claim 10, wherein the first and second mold halves of the apparatus for producing the hook-and-loop fastener connector are arranged circularly concentric to one another.

12. The hook-and-loop fastener connector according to claim 5 obtainable by an injection molding method in which the hook-and-loop fastener connector is molded in one piece in the injection mold.

13. The hook-and-loop fastener connector according to claim 5 obtainable by an injection molding method comprising the following steps a) to c):

a) injecting molten plastic into the injection mold;
b) cooling the molten plastic in the injection mold until the plastic is solid; and
c) longitudinally displacing the second mold halves along the injection mold toward the base plate of the hook-and-loop fastener connector on which the hooks are formed in order to remove the hook feet from the first mold halves.

14. The hook-and-loop fastener connector according to claim 13, wherein the injection molding method further comprises the following step d):

d) pulling on the base plate of the hook-and-loop fastener connector so as to pull out the hook heads located in the second mold halves.

15. The hook-and-loop fastener connector according to claim 13, wherein the first and second mold halves of the apparatus for producing the hook-and-loop fastener connector are arranged concentrically to one another, and wherein the injection molding method further comprises the following step d):

d) pressing on the injection molded hook heads or the injection molded base plate respectively during removal or expulsion via displacement of the concentric first and second mold halves opposite one another.

16. The hook-and-loop fastener connector according to claim 1, wherein the plane and the base plate are angled to one another at an angle (ß) in a range of 100° to 110°.

17. The hook-and-loop fastener connector according to claim 1, wherein the hook-and-loop fastener connector is a fastening device for a motor vehicle floor mat having a fastening means of 1.2 to 1.8 cm in length, measured from the base plate.

18. The hook-and-loop fastener connector according to claim 1,
wherein each hook exhibits a hook foot of circular cross-section at a diameter in a range of 0.45 to 0.6 mm.

19. The hook-and-loop fastener connector according to claim 1,
wherein each hook exhibits a hook head having a diameter 8 to 12% greater than a diameter of the hook foot.

20. The hook-and-loop fastener connector according to claim 1,
wherein each hook is 1.8 to 2.5 mm in height.

21. The hook-and-loop fastener connector according to claim 1,
wherein the base plate of the hook-and-loop fastener connector is circular and exhibits a diameter in a range of 6 to 7.5 cm and a thickness in a range of 2 to 3 mm.

* * * * *